US005992824A

United States Patent [19]
Voss

[11] Patent Number: 5,992,824

[45] Date of Patent: Nov. 30, 1999

[54] JACK FOR TRUCK TRACTOR

[76] Inventor: Frances D. Voss, P.O. Box 338, Emerson, Nebr. 68733

[21] Appl. No.: 09/040,661

[22] Filed: Mar. 17, 1998

[51] Int. Cl.$^6$ ........ B60P 1/00

[52] U.S. Cl. ........ 254/2 B; 254/8 B

[58] Field of Search ........ 254/2 B, 8 B, 254/7 B, 133 R, 93 H

[56] References Cited

U.S. PATENT DOCUMENTS

| | | | |
|---|---|---|---|
| 2,926,888 | 3/1960 | Schultz | 254/2 B |
| 2,947,513 | 8/1960 | Nolden | 254/2 B |
| 3,047,269 | 7/1962 | Renshaw | 254/93 H |
| 3,130,956 | 4/1964 | Mandelko | 254/2 B |

FOREIGN PATENT DOCUMENTS

| | | | |
|---|---|---|---|
| 75204 | 12/1952 | Denmark | 254/2 B |

*Primary Examiner*—David A. Scherbel
*Assistant Examiner*—Daniel Shanley

[57] ABSTRACT

A jack for raising automotive equipment, particularly heavy equipment such as truck tractors and trailers. The jack includes a heavy duty ram on an extended base. The base is mobile, but includes at least one vertically movable wheel. The movable wheel is engaged to retract into the base to provide a stable, non-moving platform. The top of the ram is provided with a readily removable extended platform which is shaped to be extendible between the frame of the automotive equipment and any springs, particularly leaf springs on the equipment. Convenient safety arrangements to prevent the jack from dropping are provided to provide positive mechanical engagement between the jack and its base.

4 Claims, 3 Drawing Sheets

JACK FOR TRUCK TRACTOR

BACKGROUND AND SUMMARY OF THE INVENTION

This invention pertains to floor jacks and more particularly to a floor jack adapted to lift relatively heavy automotive equipment such as truck tractors or semi-trailers. Customarily this type of equipment is lifted by hydraulic jack equipment, but use of conventional equipment has become increasingly difficult because of the structure of the equipment to be lifted.

The point of application of the jacking pad atop the ram of the jack to the equipment to be raised is a particular problem. On occasion this point of application may be the axle near a wheel to be worked on. However with tandem axles, the particular axle to be used may be effectively hidden.

Applying this jack to a portion of the leaf spring is virtually impossible because that spring is usually lying at a slope to the floor and therefore the jack has a tendency to slip, or the horizontal component of force on the sloping spring may cause the trailer to roll away, thus creating havoc.

The best point on which to jack is usually a frame member of the tractor or trailer. However, this framework is usually directly above the leaf springs and is difficult for a vertical jack to reach.

By the present invention, the jack is modified so as to be able to be used either with an extension to reach the frame member adjacent the spring or, where available, to be placed directly under a vertical point of application.

DESCRIPTION

Figure 2:
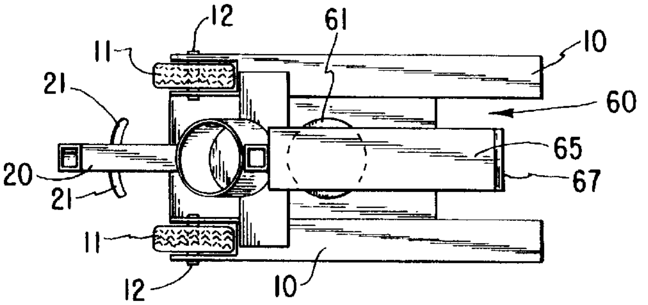
FIG. 2 is a top plan view of the jack shown in FIG. 1.

Briefly this invention comprises a floor jack for heavy automotive devices such as truck tractors and semi trailers. The new jack includes provisions for safety equipment and for attachment which make the jack more convenient and safer to use than previous equipment.

More particularly, and referring to the drawings, the jack is mounted on a base 10. The base includes a pair of wheels 11 journalled on axles 12 on the base so that the entire jack can be wheeled across the floor to the desired place. A third wheel 13 is provided journalled on a lever 14 and attached to parts of the base by a hinge 15. A projection 16 from the moving part of the jack column is adapted to engage the end 17 of the lever 14 when the jack is at its lowest position.

Thus, when the jack is lowered, the lever 14 is forced downward and the wheel 13 is extended to roll on the floor. When the jack is raised—as when it is in use—then the wheel is pushed upward by the floor so that the frame sets on the floor to provide frictional force to hold the base in place.

A handle 20 is fixed to the base and is used to move the base and the jack. That handle may also included bars 21 to hold a pressurizing tank 22 used to provide hydraulic or pneumatic fluid to raise the jack. The fluid is transmitted by means of a hose 23 to the lower end of the jack column principal cylinder 24.

The principal operating part of the jack is enclosed in the jack column. Included are a ram 27 in the form of a piston operated by fluid pressure—which may be hydraulic or pneumatic—with a principal cylinder 24. Part of the ram 27 may include a shield 28 concentric with the ram but spread apart outside the ram 27 to cover the ram and embrace the cylinder 24 in the space between the ram 27 and its cover 28.

Figure 7:
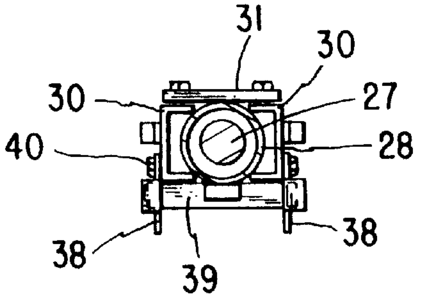
FIG. 7 is a sectional view from line 7—7 of FIG. 6.
Figure 9:
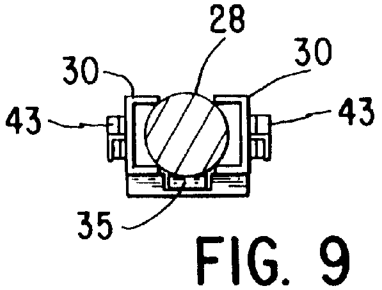
FIG. 9 is a top plan view of the portion of the column shown in FIG. 8.

Added support for the jack column is provide by an exterior frame composed of two channel shaped parts 30 (FIG. 7). These parts are securely fastened to the base 10 and embrace the cover 28. A plate 31 fixed to the posts 30 holds these posts in place relative to each other.

The safety mechanism to prevent unwanted collapse of the raised jack is formed in connection with the posts 31 and the covers 28. Bosses 35 are formed on or carried by the cover 28 and rise and fall with that cover as the jack column is raised or lowered. A rigid brace 36, which has as its counterpart, the plate 31 also engaged between the posts 30. However, this brace 26 is formed with a bridge 37 which will allow the bosses 35 to slide past under the bridge 37.

Figure 4:
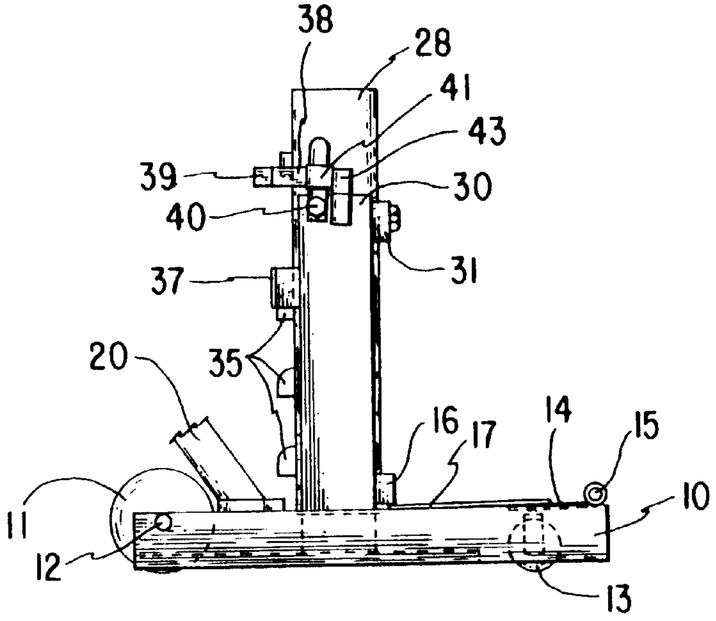
FIG. 4 is a detailed partial view similar to a part of FIG. 1 in which the jack is mobile.
Figure 8:
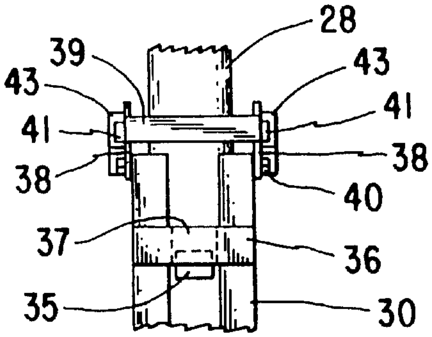
FIG. 8 is a detailed elevational view of a supporting device on the jack column.

A latching device composed of two angle-shaped legs 38 joined by a cross member 39 is pivotally connected at an end of each angle leg 38 by a screw 40 or other type of pivot so that the cross member 39 may be moved from a down position (FIGS. 1 and 6) to an up position (FIGS. 4 and 8). In its down position, the cross member 39 lies adjacent to the edges of the posts 30, and is therefore in a position to be engaged by any one of the bosses 35. Because the bosses 35 are sloped or rounded at the upper edge, the raising of those bosses by the jack will simply slide the cross member out of the way and the jack can be extended. However the bosses have a flat edge on the lower side, and therefore if the jack is collapsing or being lowered, the boss will catch on the cross member 39 and thus will be physically prevented from going any further down, thus preventing an accidental full collapse of the jack.

The angle legs 38 may carry a pad 41 composed of soft iron or similar magnetic material near or at the apex of the angle in the legs 38. Magnets 43 are attached to the posts 30 in position to be engaged by the pad 41 to hold the latch normally in its up position when the jack is being lowered. When the jack is being raised, the latch is manually dropped so that the cross member 39 is in position to stop and hold the boss 35 adjacent to it so that the jack will not collapse.

Figure 5:
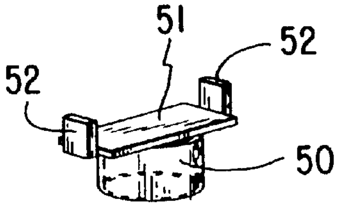
FIG. 5 is a detailed view of one type of tip for the top of the jack ram.

At the top of the jack pillar, the shield 28 is of simple cylindrical form. Various types of caps may be used to provide support for the vehicle being jacked. As an example, a simpler cap is shown in FIG. 5. A cap 50 of a shape to smoothly slide over the top of the shield 28 also carries a bracket 51 having side plates 52. The bracket may be formed to embrace a portion of the vehicle such as a frame member or an axle to provide a jacking area whereby the vehicle may be lifted.

Figure 1:
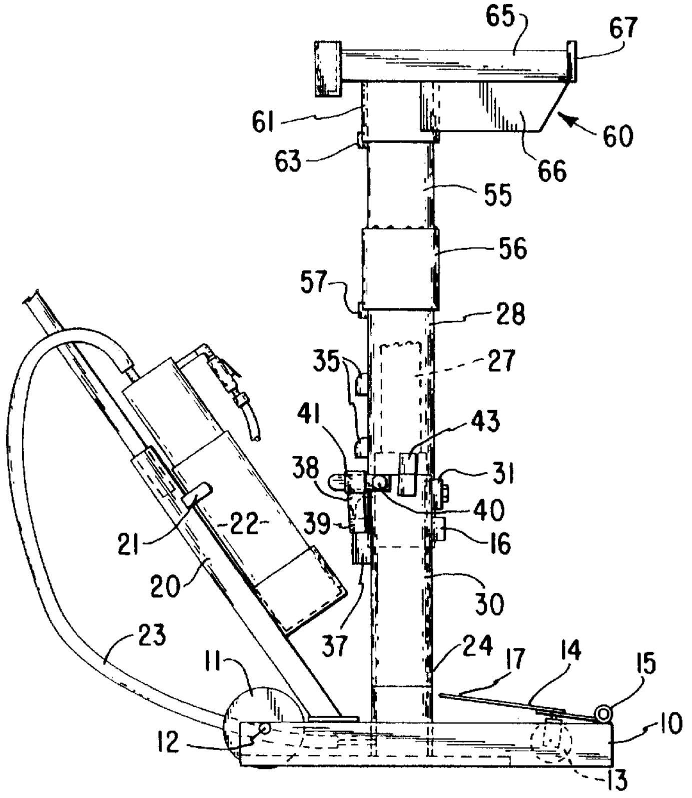
FIG. 1 is a side elevational view of the jack of the invention.
Figure 3:
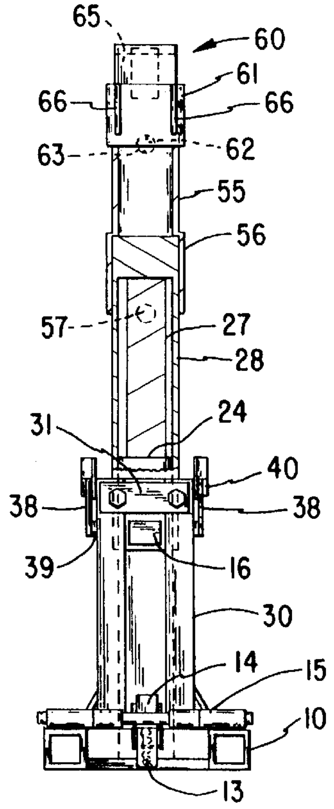
FIG. 3 is an end elevational view of that jack.
Figure 6:
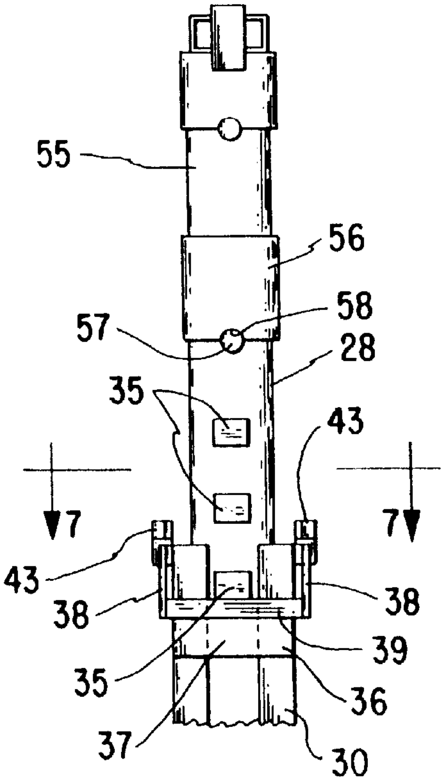
FIG. 6 is a partial side elevational view of the upper part of the jack column.

Variation of the simple cap 50 may be used. If the surface to be engaged on the vehicle is higher than the ground or from the floor, an extension may be used. Such an extension is shown in FIGS. 1, 3 and 6. The exterior piece 55 also includes a cap 56 adapted to fit over the top of the shield 28. Preferably a post 57 extends radially from the shield 28 near its top, and is in position to fit into a dimple 58.

This type of matching fit prevents rotation of the extension 55. Such prevention may not be important when the jack is used as a straight lifting device, however with many heavy truck-tractors or trailers, there is difficulty finding a good jacking point for the straight lift therefore, a cantilevered lateral support may be desirable. Such a cantilevered support is illustrated in FIGS. 1–3 which also shows the extended post 55.

The cantilevered support member 60 includes a collar 61 similar to the cup 56. This collar also includes an edge having a dimple 62 fitting over a peg 63 on the extension 55. An arm 65 extends laterally for the collar 61 and is additionally supported by brace members 66. A plate 67 extending above the arm 65 inhibits any sliding of the arm 65 from under the jacking point.

This type of lateral extension makes possible the reaching of the jack to a jacking point on the frame above a leaf spring or the like so that a more firm point can be reached. In some units, such an extension can be very useful because of crowded conditions at the wheel area where jacking may be necessary.

It will be apparent that this invention provides a safe and useful heavy duty jack with safety devices that are convenient to operate.

I claim as my invention:

1. A jack for lifting heavy vehicles comprising a base, a jack column on said base and including a fluid operated piston and cylinder device to expand and retract said column, said column including a stationary part mounted on said base and a moving part slidably engaged with said stationary part, safety means including a generally U-shaped latching device, the legs of said U-shape being pivotally mounted on opposite sides of said stationary part, bosses formed on said movable part, said latching device being pivoted from an upper position in which said bosses are free to slide thereunder to a lower position in which said bosses engage the bottom of said U-shaped latching device as said movable part is retracted to prevent retraction of said column when said safety means is engaged.

2. The jack of claim 1 in which said bosses each have an upper edge and a lower edge, said lower edge being substantially perpendicular to said latching device whereby they will be permanently caught by said latching device as said movable part is retracted, said upper edge being sloped to slide said latching device away from said bosses as said movable part is raised.

3. A jack for lifting heavy vehicles comprising a base, a jack column on said base and including a fluid operated piston and cylinder device to expand and retract said column, said column including a stationary part mounted on said base and a moving part slidably engaged with said stationary part, safety means including a latching device pivotally mounted on said stationary part, bosses formed on said movable part, said latching device being pivoted from an upper position in which said bosses are free to slide thereunder to a lower position in which said bosses engage said latching device as said movable part is retracted, said latching device also including pads of magnetic material, magnets mounted on said stationary part, said pads being engaged with said magnets when said latching device is in its upper position.

4. The jack of claim 3 in which said stationary part includes two posts spaced apart to provide a gap therebetween, one post being disposed opposite the other on opposite sides of said piston and cylinder device, said bosses being arranged to move vertically within said gap, said latching device being pivotally mounted on said posts and extending across said gap to be engageable by said bosses.

* * * * *